United States Patent
Cho et al.

(10) Patent No.: US 10,097,459 B2
(45) Date of Patent: Oct. 9, 2018

(54) APPARATUS AND METHOD FOR HIGH-SPEED DATA TRANSMISSION BETWEEN VIRTUAL DESKTOPS

(71) Applicant: Electronics and Telecommunications Research Institute, Daejeon (KR)

(72) Inventors: Jung-Hyun Cho, Daejeon (KR); Seong-Woon Kim, Gyeryong-si (KR); Jong-Bae Moon, Daejeon (KR); Hag-Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 73 days.

(21) Appl. No.: 15/195,242

(22) Filed: Jun. 28, 2016

(65) Prior Publication Data

US 2017/0195226 A1 Jul. 6, 2017

(30) Foreign Application Priority Data

Jan. 4, 2016 (KR) .......................... 10-2016-0000678

(51) Int. Cl.
| | |
|---|---|
| G06F 15/16 | (2006.01) |
| H04L 12/741 | (2013.01) |
| H04L 29/12 | (2006.01) |
| H04L 12/805 | (2013.01) |
| H04L 12/46 | (2006.01) |
| G06F 12/00 | (2006.01) |

(52) U.S. Cl.
CPC ........ H04L 45/745 (2013.01); H04L 12/4633 (2013.01); H04L 47/365 (2013.01); H04L 61/6022 (2013.01)

(58) Field of Classification Search
CPC ... H04L 12/4625; H04L 45/586; H04L 45/74; H04L 45/745; H04L 49/70; H04L 12/4633; H04L 12/4641; H04L 41/147; H04L 41/5019; H04L 43/0852; H04L 61/2514; H04L 61/2517
See application file for complete search history.

(56) References Cited

U.S. PATENT DOCUMENTS

| | | | |
|---|---|---|---|
| 8,265,075 | B2 | 9/2012 | Pandey |
| 8,705,513 | B2 | 4/2014 | Van Der Merwe et al. |

(Continued)

FOREIGN PATENT DOCUMENTS

| | | |
|---|---|---|
| KR | 10-2014-0079553 A | 6/2014 |
| KR | 10-2015-0039377 A | 4/2015 |

*Primary Examiner* — Zarni Maung
(74) *Attorney, Agent, or Firm* — William Park & Associates Ltd.

(57) ABSTRACT

An apparatus and method for high-speed data transmission between virtual desktops are disclosed herein. The apparatus for high-speed data transmission between virtual desktops includes a reception unit, a destination determination unit, and a transmission unit. The reception unit receives data that is transmitted by virtual desktop servers inside a virtual desktop host server. The destination determination unit determines whether the destination of the data is the inside of the host server or the outside of the host server based on network identifiers set for the respective virtual desktop servers. The transmission unit sets up a data transmission method based on the destination of the data, and transmits the data using the transmission method.

16 Claims, 9 Drawing Sheets

(56) References Cited

U.S. PATENT DOCUMENTS

| | | | |
|---|---|---|---|
| 8,830,873 B2* | 9/2014 | Tomic | H04L 12/462 |
| | | | 370/255 |
| 2005/0063393 A1* | 3/2005 | Lin | H04L 29/12462 |
| | | | 370/395.54 |
| 2006/0085621 A1* | 4/2006 | Tsukada | G06F 3/0607 |
| | | | 711/202 |
| 2012/0167086 A1 | 6/2012 | Lee | |
| 2013/0104197 A1* | 4/2013 | Nandakumar | G06F 21/36 |
| | | | 726/4 |
| 2013/0160005 A1 | 6/2013 | Jung et al. | |
| 2015/0131661 A1* | 5/2015 | Curtis | H04L 12/4641 |
| | | | 370/392 |
| 2015/0215207 A1* | 7/2015 | Qin | H04L 12/4625 |
| | | | 370/392 |
| 2017/0099197 A1* | 4/2017 | Raney | H04L 43/028 |

* cited by examiner

APPARATUS AND METHOD FOR HIGH-SPEED DATA TRANSMISSION BETWEEN VIRTUAL DESKTOPS

CROSS-REFERENCE TO RELATED APPLICATION

This application claims the benefit of Korean Patent Application No. 10-2016-0000678, filed on Jan. 4, 2016, which is hereby incorporated by reference herein in its entirety.

BACKGROUND

1. Technical Field

The present disclosure relates generally to technology that transmits data between virtual desktops, and more particularly to technology that transmits data at high speed according to the destination of the data when transmitting the data between virtual desktops.

2. Description of the Related Art

Virtualization technology is technology that drives a plurality of virtual desktops inside the same host server based on a hypervisor, such as VMware, Xen, or KVM. Virtualization technology has been actively researched because it has advantages in terms of the maximization of use of resources, a reduction in maintenance and management cost, etc.

The hypervisor refers to a logical platform that is intended to simultaneously execute a plurality of operating systems on a host computer.

In a virtualization environment, a single actual device is shared by a plurality of virtual desktops, and thus the intermediation of a hypervisor is required. However, a reduction in performance occurs due to the intermediation of the hypervisor, and thus Direct Access IO was proposed in order to overcome such a reduction.

However, upon direct access input/output, problems regarding a memory area problem, full virtualization support, device sharing, etc. may occur. In order to overcome these problems, Single Root IO Virtualization (SR-IOV) was proposed. SR-IOV can support device sharing functionality upon direct access input/output in terms of hardware, and can divide a single device into a plurality of virtual devices and assign the virtual devices to virtual desktops.

A virtual switch (a software router) attracts attention because it can achieve a reduction in cost, flexibility for application to various platforms, the ease of maintenance and management, etc. compared to a conventional hardware router. A software router is configured in a structure in which an operating system is installed on hardware and the software router operates on the operating system. Representative software routers include Click that enables the dynamic change of a module and thus allows a router to be flexibly and freely set, OpenFlow that separates the control of data and the control of routing and thus enables more flexible and dynamic flow table management, and XORP that can support a plurality of unicast and multicast routing protocols.

An OpenFlow controller issues a command to a switch, and the switch performs processing, such as the transmission of a packet to a destination, the modification of a packet, the discarding of a packet, etc., in response to the command. Generally, an OpenFlow switch is constructed by adding an OpenFlow protocol to an L2 switch as firmware, and a controller is implemented as software. Using the OpenFlow protocol, the controller transfers a forwarding method for a packet, a VLAN priority value, or the like to the switch so that it can be processed, and the switch queries the controller about failure information and a packet without a previously registered flow entry, receives results and then performs processing.

Since virtual desktop technology enables access and use anywhere and at any time, it facilitates access and use, and also facilitates the generation and management of servers in which various operating systems and applications have been installed. A demand for constructing a system, in which a plurality of servers operates, using virtual desktop servers and using the virtual desktop servers in conjunction with each other by the use of the above advantages is increasing.

However, unless the transmission of data between servers constituting virtual desktops is distinguished as the transmission of data between virtual desktops operating inside the same server or the transmission of data to the outside of a host server, the waste in which the transmission of data between virtual desktops repeatedly reenters a network physical switch and transmission delay occur. In particular, in the case of a video conference system or a multi-view image processing system that exchanges high-quality images, the amounts of data transmission vary depending on the roles of individual servers, such as a data input/output processing server, an image processing server, an image compression server, etc., and cases where data transmission is performed between servers more frequently occur than cases where data is directly provided to a user.

However, the conventional technologies do not suggest or imply technology that distinguishes between the transmission of data inside a host server and the transmission of data to the outside of a host server.

Korean Patent Application Publication No. 2015-0039377 discloses a configuration that generates a composite address by mapping memory space that is used within a virtualization environment. In particular, Korean Patent Application Publication No. 2015-0039377 discloses technology that is capable of setting a virtual access area using a composite address and managing access to an apparatus.

However, Korean Patent Application Publication No. 2015-0039377 does not disclose technology that is capable of determining whether the transmission of data is transmission inside a host server or transmission to the outside of a host server using a composite address.

Therefore, since virtualization-based technologies have emerged recently and there is a tendency for fast data processing to be required, there is a need for technology that determines whether the transmission of data is transmission inside a host server or transmission to the outside of a host server within a virtualization environment.

SUMMARY

At least one embodiment of the present invention is intended to transmit data at high speed within a virtualization environment.

At least one embodiment of the present invention is intended to distinguish between the transmission of data to the inside of a virtual host server and the transmission of data to the outside of a virtual host server within a virtualization environment.

At least one embodiment of the present invention is intended to determine the destination of data and then transmit the data at high speed using a differing transmission method.

According to an aspect of the present invention, there is provided an apparatus for high-speed data transmission between virtual desktops, including: a reception unit configured to receive data that is transmitted by virtual desktop servers inside a virtual desktop host server; a destination determination unit configured to determine whether the destination of the data is the inside of the host server or the outside of the host server based on network identifiers set for the respective virtual desktop servers; and a transmission unit configured to set up a data transmission method based on the destination of the data and to transmit the data using the transmission method.

Each of the network identifiers may be generated using the MAC address of the host server.

Each of the network identifiers may include a vendor ID corresponding to a virtual desktop server and a host ID corresponding to the host server.

The destination determination unit may determine whether the type of destination of the data is the inside of the host server or the outside of the host server based on the host ID.

The destination determination unit, when the destination of the data is the inside of the host server, may determine a virtual desktop server that will receive the data based on the vendor ID.

The destination determination unit may determine a switch port corresponding to a virtual desktop server corresponding to the destination using a forwarding table in which an MAC address corresponding to the destination has been mapped to the switch port.

The transmission unit, when the destination of the data is the inside of the host server, may set the size of a maximum transmission unit (MTU) to a maximum value, and may transmit the data using memory that is used only for the transmission of the data.

The destination determination unit, when a host ID inside the network identifier is not the same as the ID of the host server, may determine that the destination of the data is the outside of the host server.

The transmission unit, when the destination of the data is the outside of the host server, may map the virtual network interface card of the virtual desktop server, which transmits the data, to the virtual network interface card of SR-IOV, and may transmit the data using the SR-IOV.

According to another aspect of the present invention, there is provided a method for high-speed data transmission between virtual desktops, including: receiving data that is transmitted by virtual desktop servers inside a virtual desktop host server; receiving, by a virtual switch, the data, and determining, by the virtual switch, whether the destination of the data is the inside of the host server or the outside of the host server based on a network identifier corresponding to the data; and setting up a data transmission method based on the type of destination of the data, and transmitting the data using the transmission method.

The network identifier may be generated using the MAC address of the host server.

The network identifier may include a vendor ID corresponding to a virtual desktop server and a host ID corresponding to the MAC address of the host server.

Determining whether the destination of the data is the inside of the host server or the outside of the host server may include determining whether the type of destination of the data is the inside of the host server or the outside of the host server based on the host ID.

Determining whether the destination of the data is the inside of the host server or the outside of the host server may include, when the destination of the data is the inside of the host server, determining a virtual desktop server that will receive the data based on the vendor ID.

Determining whether the destination of the data is the inside of the host server or the outside of the host server may include determining a switch port corresponding to a virtual desktop server corresponding to the destination using a forwarding table in which an MAC address corresponding to the destination has been mapped to the switch port.

Transmitting the data may include, when the destination of the data is the inside of the host server, setting the size of an MTU to a maximum value, and transmitting the data using memory that is used only for transmission of the data.

Determining whether the destination of the data is the inside of the host server or the outside of the host server may include, when a host ID inside the network identifier is not the same as the ID of the host server, determining that the destination of the data is the outside of the host server.

Transmitting the data may include, when the destination of the data is the outside of the host server, mapping the virtual network interface card of the virtual desktop server, which transmits the data, to the virtual network interface card of SR-IOV, and transmitting the data using the SR-IOV.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
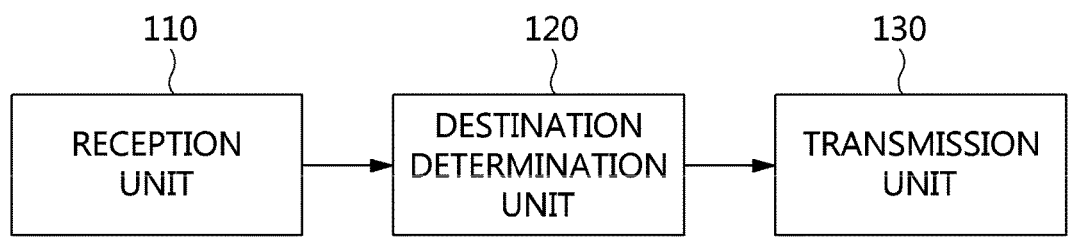
FIG. 1 is a block diagram showing an apparatus for high-speed data transmission between virtual desktops according to an embodiment of the present invention.

Embodiments of the present invention will be described in detail below with reference to the accompanying drawings.

Redundant descriptions and descriptions of well-known functions and configurations that may make the gist of the present invention unnecessarily obscure will be omitted below. The embodiments of the present invention are intended to more completely describe the present invention to persons having ordinary knowledge in the art to which the present invention pertains. Accordingly, the shapes, sizes and the like of components in the drawings may be exaggerated to make the description obvious.

Embodiments of the present invention will be described in detail with reference to the accompanying drawings below.

FIG. 1 is a block diagram showing an apparatus for high-speed data transmission between virtual desktops according to an embodiment of the present invention.

Referring to FIG. 1, the apparatus for high-speed data transmission between virtual desktops according to the present embodiment includes a reception unit 110, a destination determination unit 120, and a transmission unit 130.

The reception unit 110 receives data transmitted by virtual desktop servers inside a virtual desktop host server.

The destination determination unit 120 determines whether the destination of the data is the inside of the host server or the outside of the host server based on network identifiers set for the respective virtual desktop servers.

In the case where data is transmitted/received through the driving of a separate server without the transmission of a screen to a user, the data is transmitted/received between the virtual desktop servers. When the virtual desktop servers are present inside the same host server, technology that transmits the data to an actual network and then transmits the data to the virtual desktop server is employed, although the data can be transmitted/received without the use of the actual network.

Accordingly, the present invention is configured to, when data is transmitted/received, set a destination and determine whether to transmit data to an actual network according to the destination.

In this case, the destination may be any one of the inside of the host server and the outside of the host server.

In this case, when the destination is the inside of the host server, a path through which data is transmitted/received between separate servers without the transmission of a screen to a user is established.

Furthermore, when the destination is the outside of the host server, a path that uses an actual network for the reason, such as the transmission of a screen to the user or the like, is established.

In this case, the destination may be distinguished by a network identifier.

In this case, the network identifier may be generated using the MAC address of the host server. Furthermore, the network identifier may include a vendor ID corresponding to the virtual desktop server and a host ID corresponding to the host server.

In this case, the vendor ID may refer to the virtual desktop server that transmits data.

In this case, the host ID may refer to the host server in which the virtual desktop servers are present.

That is, the destination determination unit 120 may determine whether the destination to which the data is transmitted is the same host server using the host ID. For example, when the host ID of the current host server is 1 and the host ID of the host server in which the virtual desktop server that will receive data is present is 1, the destination determination unit 120 may determine that the destination of the data that is transmitted is a host server that is the same as the current host server.

For another example, when the host ID of the current host server is 1 and the host ID of the host server in which the virtual desktop server that will receive data is present is 11, the destination determination unit 120 may determine that the destination to which the data is transmitted is a different host server, i.e., the outside of the current host server.

That is, when the host ID within the network identifier is not the same as the ID of the host server, the destination determination unit 120 may determine that the destination of the data is the outside of the current host server.

In this case, when the destination determination unit 120 determines that the destination of the data is the inside of the host server, the destination determination unit 120 may determine a switch port corresponding to the virtual desktop server corresponding to the destination using a preset forwarding table.

The transmission unit 130 sets up a data transmission method according to the type of destination of the data, and transmits the data using the transmission method.

In this case, when it is determined that the destination of the data is the inside of the host server, the transmission unit 130 may set the size of an MTU to a maximum value, and may transmit the data using memory that is used only for the transmission of the data.

In this case, the MTU refers to a size to which data or a packet is maximally segmented and which can be transmitted. That is, when the set size of the MTU becomes larger, the size of data that can be transmitted at one time increases. Accordingly, as long as bandwidth can be supported, data may be transmitted at high speed.

That is, the present invention provides a configuration that, when the destination of data is the inside of the host server, maximally increases the MTU and transmits data at high speed using a dedicated buffer (memory) that is used only for internal transmission.

Furthermore, when it is determined that the destination of the data is the outside of the host server, the transmission unit 130 may map the virtual network interface card of the virtual desktop server, which transmits data, to a virtual network interface card vNIC inside SR-IOV, and may transmit the data using the SR-IOV.

In this case, the vNIC of the virtual desktop server and the vNIC of the SR-IOV may be mapped to each other using a virtual function (VF), and may be dynamically assigned and thus guarantee bandwidth, thereby being able to reduce load.

Referring to FIGS. 2 to 7, the way in which an apparatus for high-speed data transmission between virtual desktops according to an embodiment of the present invention transmits data is described based on the description given in conjunction with FIG. 1.

Figure 2:
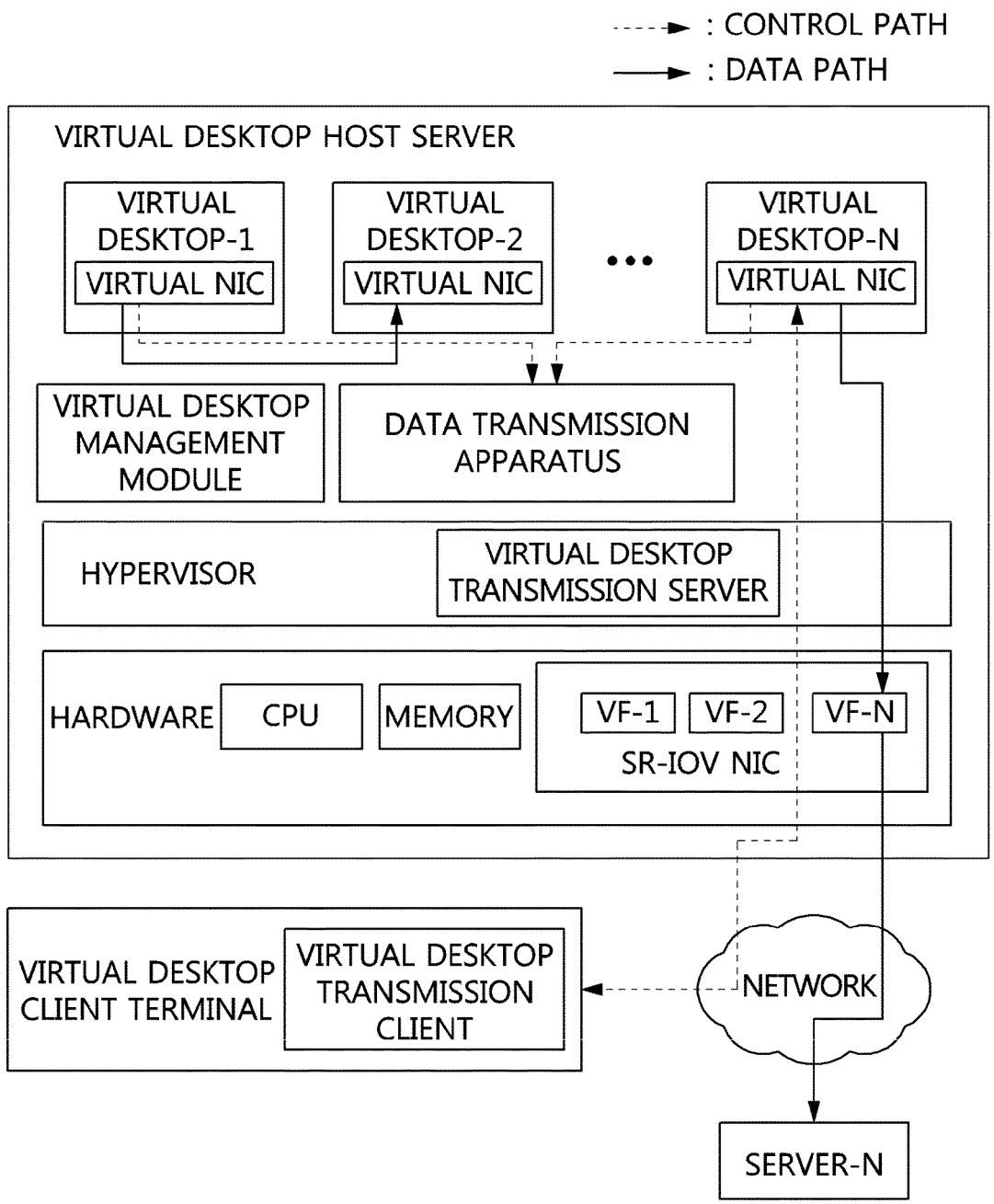
FIG. 2 is a diagram showing the way in which an apparatus for high-speed data transmission between virtual desktops according to an embodiment of the present invention transmits data.

First, FIG. 2 is a diagram showing the way in which the apparatus for high-speed data transmission between virtual desktops according to the present embodiment transmits data.

Referring to FIG. 2, a virtual desktop host server includes virtual desktop servers, a virtual desktop management module, a data transmission apparatus according to the present invention, a hypervisor, and hardware.

The virtual desktop host server refers to a server in which virtual desktops are managed.

In this case, the virtual desktop host server may manage a plurality of virtual desktop servers.

The hypervisor functions to virtualize actual hardware resources and perform control so that the virtual desktop servers can use the virtualized hardware resources.

In particular, the hardware of the virtual desktop host server includes SR-IOV network interface cards NICs.

These SR-IOV network interface cards NICs may function to guarantee the input and output performance of an actual network and reduce the loading of load.

A virtual desktop client terminal may provide service that transmits screens of the virtual desktops to a user or enables the user to check the situation of the processing of data.

In this case, the virtual desktop client terminal may receive data that is transmitted by the virtual desktop servers operating in conjunction with a hypervisor via a protocol, thereby using or controlling the virtual desktop servers.

As described in conjunction with FIG. 1, in the case where data of a virtual desktop server driven by a separate server is transmitted/received, data is transmitted/received between virtual desktop servers. In the case of virtual desktop servers present inside the same host server, unless a network packet is distinguished, the data is transmitted to an actual network and is then transmitted to the virtual desktop server, although the data can be transmitted/received without the use of the actual network.

However, according to the present invention, when data is transmitted/received, a destination may be set, and it may be determined according to the destination whether to perform processing through internal communication inside a host server or to transmit data to a network via an external physical switch.

Referring to FIG. 2, it can be seen that in the case of the transmission of data between virtual desktop servers inside the same host server, a control path is established through the data transmission apparatus, not the hypervisor. That is, it can be seen that the data transmission apparatus according to the present invention controls the transmission of data between virtual desktop servers inside the same host server.

Furthermore, referring to FIG. 2, it can be seen that in the case of the transmission of data between different host servers, the hypervisor is also bypassed, mapping to the NIC of the SR-IOV is performed, and then the data is transmitted.

Figure 3:
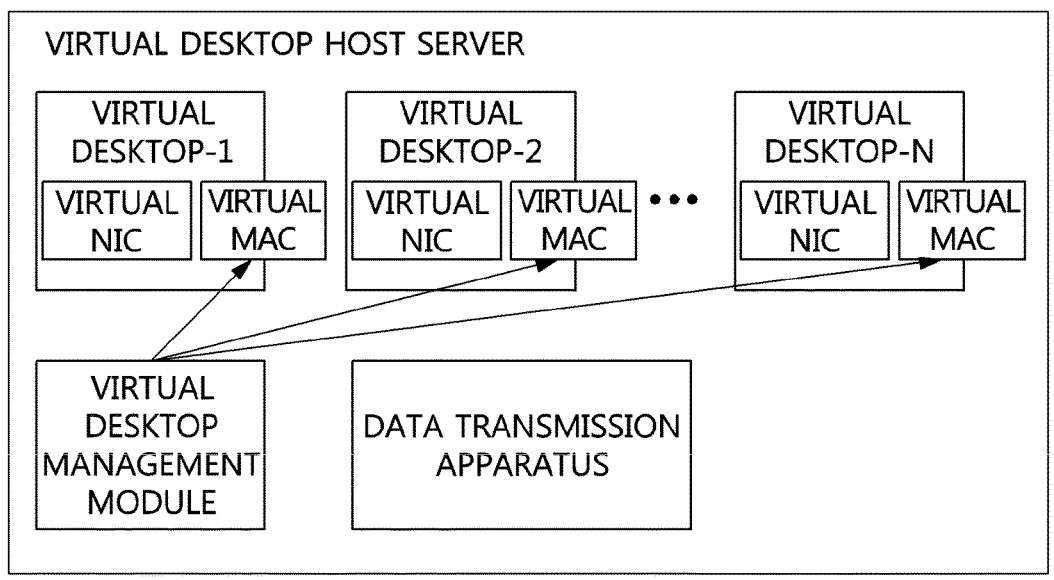
FIG. 3 is a diagram showing the generation of network identifiers that are used by an apparatus for high-speed data transmission between virtual desktops according to an embodiment of the present invention.

FIG. 3 is a diagram showing the generation of network identifiers that are used by an apparatus for high-speed data transmission between virtual desktops according to an embodiment of the present invention.

During the generation of virtual desktop servers, virtual resources are set up and assigned. At this time, network identifiers may be generated.

In this case, the network identifiers may be generated by the virtual desktop management module.

In this case, vMACs may be generated according to preset virtual MAC policies, and may be assigned to the respective virtual desktop servers.

In this case, network identifiers may be generated using the vMACs assigned to the virtual desktop servers.

In this case, each of the network identifiers may be generated by combining a vendor ID corresponding to the virtual desktop server with a host ID corresponding to the host server. For example, the network identifier may be generated by sequentially combining the vendor ID and the host ID and finally adding 8-bit information thereto.

In this case, since the network identifier includes the host ID, the host ID is identified, and it may be rapidly determined whether a virtual desktop server in question is a virtual desktop server in the same host.

Figure 4:
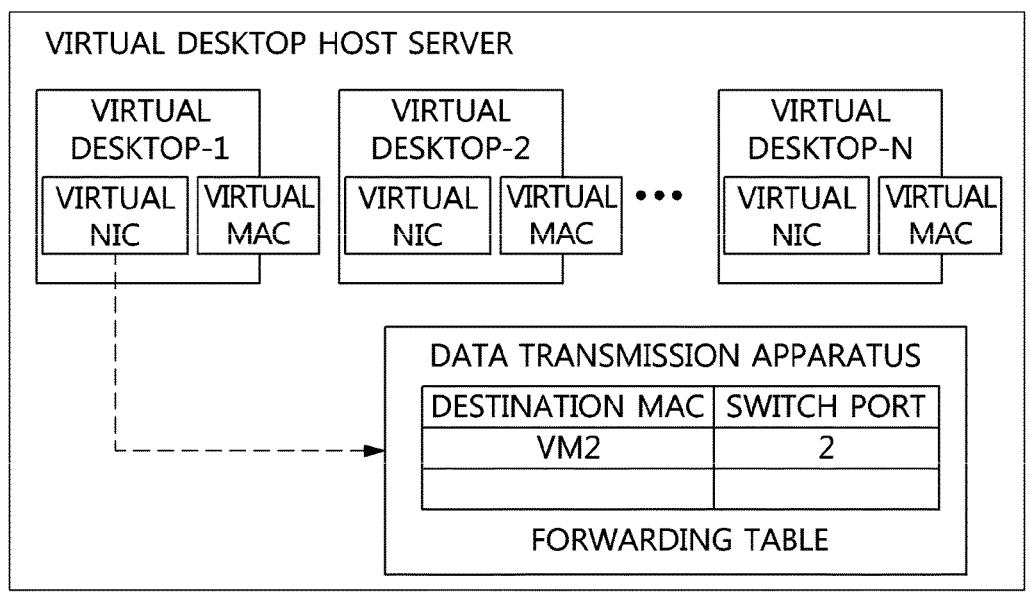
FIG. 4 is a diagram showing the determination of the destination of data that is performed by an apparatus for high-speed data transmission between virtual desktops according to an embodiment of the present invention.

FIG. 4 is a diagram showing the determination of the destination of data that is performed by an apparatus for high-speed data transmission between virtual desktops according to an embodiment of the present invention.

Referring to FIG. 4, the data transmission apparatus corresponding to the present invention receives data that is transmitted by virtual desktop servers.

In this case, the destination determination unit 120 inside the data transmission apparatus may determine whether a destination is a virtual desktop (which may be, for example, the virtual desktop-2 shown in FIG. 4) inside the same host by analyzing a network identifier inside the data.

In this case, when the destination is a virtual desktop server inside the same host, a switch required for the transmission of data may be determined using a preset forwarding table.

For example, referring to the forwarding table shown in FIG. 4, when the destination is a virtual desktop-2 VM2, it can be seen that 2 is designated as a switch port. That is, it can be seen that when the destination is determined, data may be transmitted by manipulating the switch port in the forwarding table.

Figure 5:
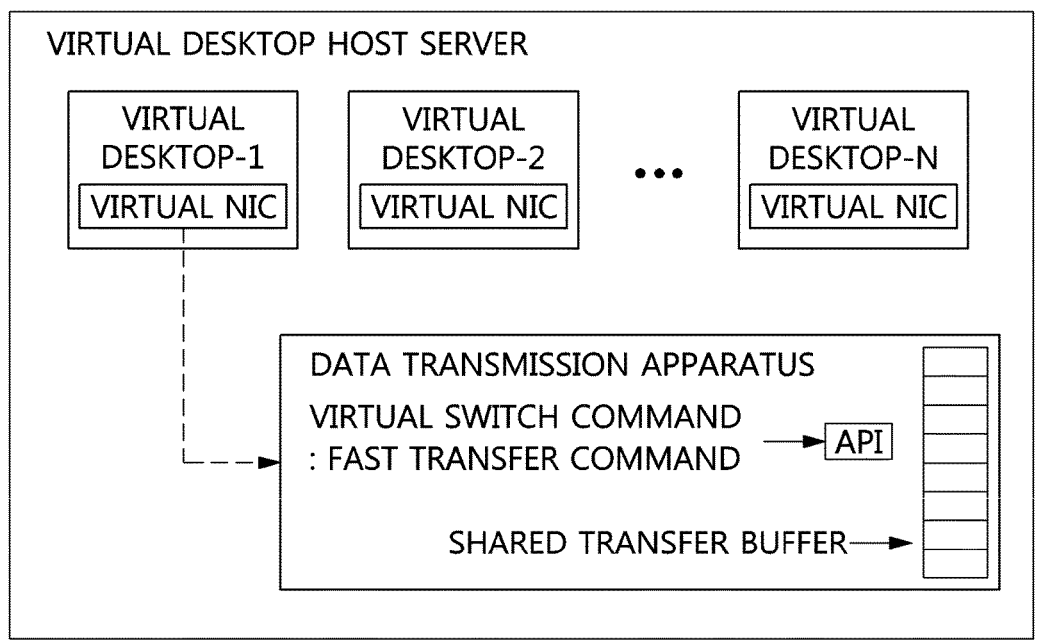
FIG. 5 is a diagram showing the generation of memory that is used by an apparatus for high-speed data transmission between virtual desktops according to an embodiment of the present invention to transmit data to the inside of a host server.

FIG. 5 is a diagram showing the generation of memory that is used by an apparatus for high-speed data transmission between virtual desktops according to an embodiment of the present invention to transmit data to the inside of a host server.

Referring to FIG. 5, upon transmission of data inside the same host, a high-speed transmission command is first executed using a virtual switch API.

In this case, in response to the high-speed transmission command, the size of an MTU between virtual desktop servers that perform transmission and reception may be set to a maximum value.

Figure 6:
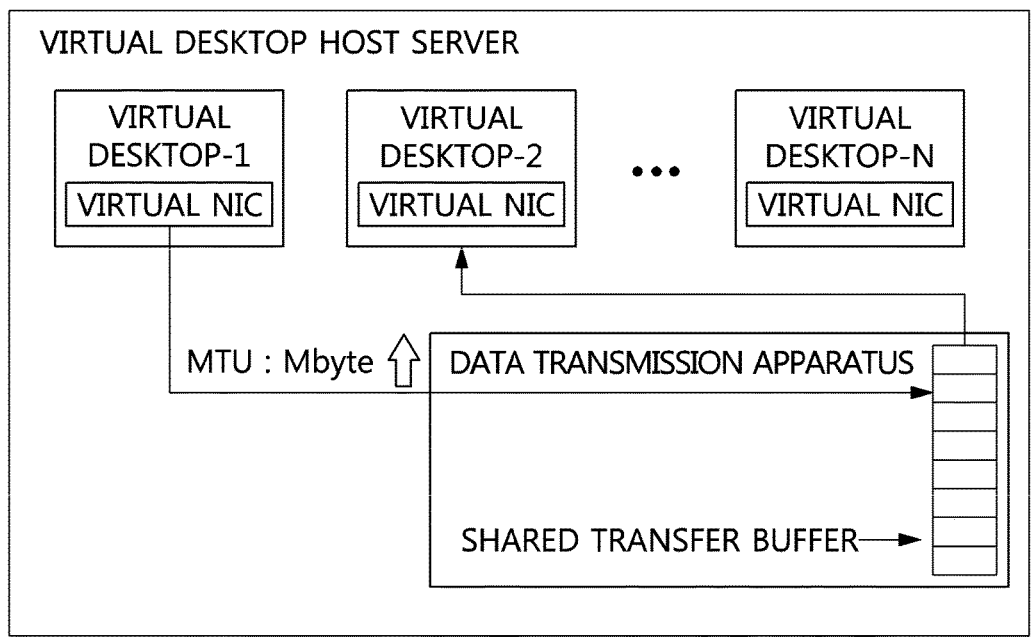
FIG. 6 is a diagram showing the transmission of data inside a host server that is performed by an apparatus for high-speed data transmission between virtual desktops according to an embodiment of the present invention.

FIG. 6 is a diagram showing the transmission of data inside a host server that is performed by an apparatus for high-speed data transmission between virtual desktops according to an embodiment of the present invention, which is connected to the description of FIG. 5.

In this case, received data may be transmitted to a destination (virtual desktop server-2) using dedicated memory.

In this case, the dedicated memory may be used only when data is transmitted inside the same host.

Figure 7:
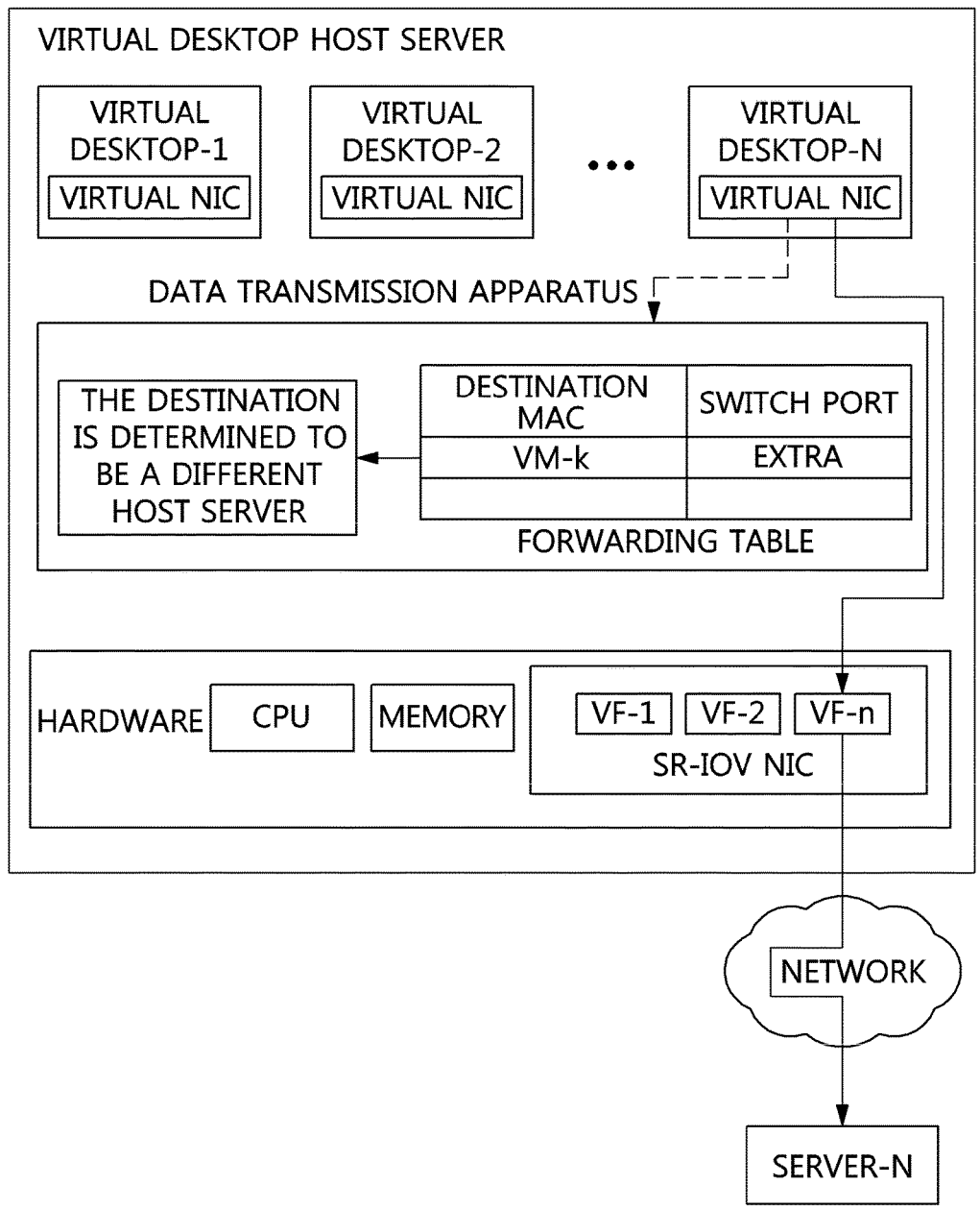
FIG. 7 is a diagram showing the transmission of data to the outside of a host server that is performed by an apparatus for high-speed data transmission between virtual desktops according to an embodiment of the present invention.

FIG. 7 is a diagram showing the transmission of data to the outside of a host server that is performed by an apparatus for high-speed data transmission between virtual desktops according to an embodiment of the present invention.

FIG. 7 shows a case where data is transmitted to a server outside a host server, not a case where data is transmitted to a virtual desktop server inside the same host server.

First, the destination determination unit 120 of the data transmission apparatus according to the present invention determines that data is transmitted to a server outside a host server using a host ID inside a network identifier.

In this case, a VF of SR-IOV present in the hardware is dynamically assigned, and is thus mapped to the VNIC of a virtual desktop server (which corresponds to a virtual desktop n in FIG. 7) that transmits data.

In this case, since the vNIC of SR-IOV is directly mapped to the vNIC of the virtual desktop server, data may be input and output without the intermediation of a hypervisor.

Furthermore, bandwidth is dynamically controlled according to the amount of use of a network by applying a network bandwidth usage monitoring function, and thus high-speed transmission can be performed using a virtual desktop transmission bandwidth isolation function.

Figure 8:
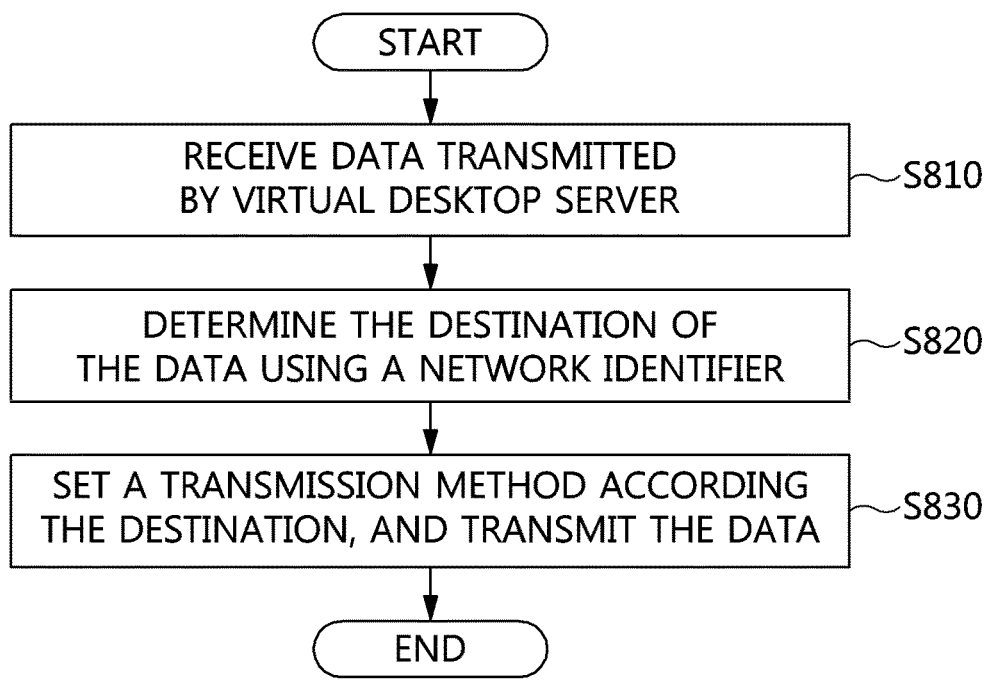
FIG. 8 is an operation flowchart showing a method for high-speed data transmission between virtual desktops according to an embodiment of the present invention.

FIG. 8 is an operation flowchart showing a method for high-speed data transmission between virtual desktops according to an embodiment of the present invention.

Referring to FIG. 8, first, data that is transmitted by virtual desktop servers inside a virtual desktop host server is received at step S810.

Furthermore, the destination of the data is determined based on a network identifier corresponding to the data at step S820.

In this case, the destination may be any one of the inside of the host server and the outside of the host server.

In this case, when the destination is the inside of the host server, a path through which the data is transmitted/received between separate servers without the transmission of a screen to a user is established.

Furthermore, when the destination is the outside of the host server, a path that uses an actual network for the reason, such as the transmission of a screen to the user or the like, is established.

In this case, the network identifier may be generated using the MAC address of the host server. Furthermore, the network identifier may include a vendor ID corresponding to the virtual desktop server and a host ID corresponding to the host server.

In this case, the vendor ID may refer to the virtual desktop server that transmits data.

In this case, the host ID may refer to a host server in which the virtual desktop servers are present.

In this case, the destination may be determined using the host ID. For example, when the host ID of the current host server is 1 and the host ID of the host server in which the virtual desktop server that will receive data is present is 1, it may be determined that the destination of the data that is transmitted is a host server that is the same as the current host server.

In this case, when it is determined that the destination of the data is the inside of the host server, a switch port corresponding to the virtual desktop server corresponding to the destination may be determined using a preset forwarding table.

Furthermore, a data transmission method is set up based on the type of destination of the data and the data is transmitted using the transmission method at step S830.

Figure 9:
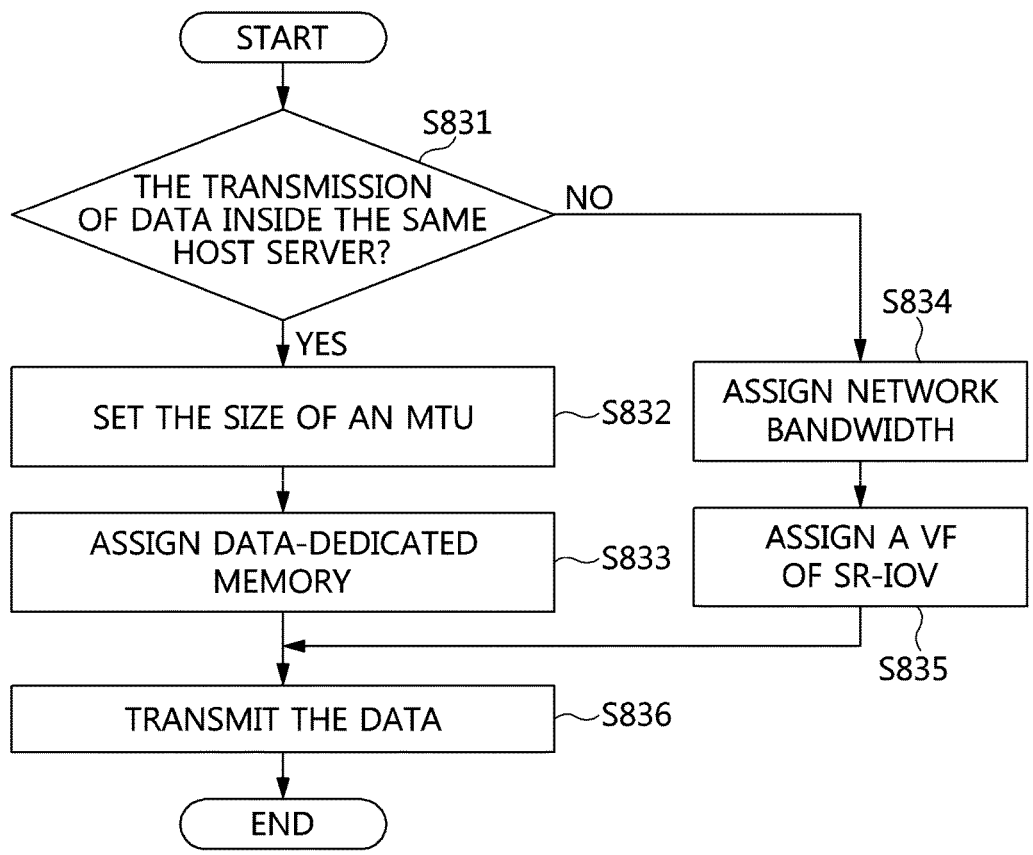
FIG. 9 is an operation flowchart indicating that data is transmitted using a differing method according to the destination of data in a method for high-speed data transmission between virtual desktops according to an embodiment of the present invention.

FIG. 9 is an operation flowchart indicating that data is transmitted using a differing method according to the destination of data in a method for high-speed data transmission between virtual desktops according to an embodiment of the present invention.

FIG. 9 shows steps S820 to S830, shown in FIG. 8, in detail.

First, it is determined whether received data is data that is transmitted to a virtual desktop server inside the same host at step S831.

Step S831 has been described in FIG. 8 in detail.

Furthermore, when it is determined that the received data is data that is transmitted to a virtual desktop server inside the same host server, the size of an MTU is set at step S832, data-dedicated memory is assigned at step S833, and the data is transmitted at step S836.

Furthermore, when it is determined that the received data is not data that is transmitted to a virtual desktop server inside the same host server, i.e., when it is determined that the received data is data that is transmitted to the outside of the host server, network bandwidth is assigned at step S834, a VF of SR-IOV is assigned at step S835, and the data is transmitted at step S836.

In this case, the MTU refers to a size to which data or a packet is maximally segmented and which can be transmitted. That is, when the set size of the MTU becomes larger, the size of data that can be transmitted at one time increases. Accordingly, as long as bandwidth can be supported, data may be transmitted at high speed.

In this case, when it is determined that the destination of the data is the outside of the host server, the transmission unit 130 may map the virtual network interface card of the virtual desktop server, which transmits data, to a virtual network interface card vNIC inside SR-IOV, and may transmit the data using the SR-IOV.

In this case, the vNIC of the virtual desktop server and the vNIC of the SR-IOV may be mapped to each other using a VF, and may be dynamically assigned and thus guarantee bandwidth, thereby being able to reduce load.

At least one embodiment of the present invention has the advantage of distinguishing between the transmission of data to the inside of a virtual host server and the transmission of data to the outside of a virtual host server within a virtualization environment and, in the case of the transmission of data to the inside of a virtual host server, resetting the size of an MTU and transmitting the data at high speed using dedicated memory.

At least one embodiment of the present invention has the advantage of distinguishing between the transmission of data to the inside of a virtual host server and the transmission of data to the outside of a virtual host server within a virtualization environment and, in the case of the transmission of data to the outside of a virtual host server, dynamically assigning network bandwidth and transmitting the data at high speed using SR-IOV.

At least one embodiment of the present invention has the advantage of easily distinguishing between the transmission of data to the inside of a virtual host server and the transmission of data to the outside of a virtual host server within a virtualization environment using a network identifier including a host ID corresponding to the virtual host server.

The above-described apparatus and method for high-speed data transmission between virtual desktops according to the present invention are not limited to the configurations and methods of the above-described embodiments, but some or all of the embodiments may be selectively combined such that the embodiments can be modified in various manners.

What is claimed is:

1. An apparatus for high-speed data transmission between virtual desktops, comprising:
   one or more processors that process computer executable program code embodied in computer readable storage media, the computer executable program code comprising:
   a reception program code that receives data that is transmitted by virtual desktop servers inside a virtual desktop host server;
   a destination determination program code that determines whether a destination of the data is an inside of the host server or an outside of the host server based on network identifiers set for the respective virtual desktop servers; and
   a transmission program code that sets up a data transmission method based on the destination of the data and to transmit the data using the transmission method,
   wherein the network identifiers is generated by the virtual desktop management module inside the host server when a virtual desktop server is generated,
   wherein the network identifiers is generated by sequentially combining the vendor ID corresponding to the virtual desktop server, the host ID corresponding to the MAC address of the host server, and 8-bit information,
   wherein the transmission program code, when the destination of the data is the inside of the host server, sets a size of a maximum transmission unit (MTU) to a maximum value such that the transmission rate is maximized.

2. The apparatus of claim 1, wherein each of the network identifiers is generated using a MAC address of the host server.

3. The apparatus of claim 2, wherein the destination determination program code determines whether a type of destination of the data is the inside of the host server or the outside of the host server based on the host ID.

4. The apparatus of claim 3, wherein the destination determination program code, when the destination of the data is the inside of the host server, determines a virtual desktop server that will receive the data based on the vendor ID.

5. The apparatus of claim 4, wherein the destination determination program code determines a switch port corresponding to a virtual desktop server corresponding to the destination using a forwarding table in which an MAC address corresponding to the destination has been mapped to the switch port.

6. The apparatus of claim 5, wherein the transmission program code transmits the data using memory that is used only for transmission of the data.

7. The apparatus of claim 3, wherein the destination determination program code, when a host ID inside the network identifier is not identical to an ID of the host server, determines that the destination of the data is the outside of the host server.

8. The apparatus of claim 7, wherein the transmission program code, when the destination of the data is the outside of the host server, maps a virtual network interface card of the virtual desktop server, which transmits the data, to a virtual network interface card of SR-IOV, and transmits the data using the SR-IOV.

9. A method for high-speed data transmission between virtual desktops, comprising:
processing computer executable program code embodied in computer readable storage media by one or more processors, the computer executable program code comprising:
program code that receives data that is transmitted by virtual desktop servers inside a virtual desktop host server;
program code that receives and determines whether a destination of the data is an inside of the host server or an outside of the host server based on a network identifier corresponding to the data; and
program code that sets up a data transmission method based on a type of destination of the data, and transmitting the data using the transmission method,
wherein the network identifiers are generated by the virtual desktop management module inside the host server when a virtual desktop servers is generated,
wherein the network identifiers are generated by sequentially combining the vendor ID corresponding to the virtual desktop server, the host ID corresponding to the MAC address of the host server, and 8-bit information thereto,
wherein the transmission program code, when the destination of the data is the inside of the host server, sets a size of a maximum transmission unit (MTU) to a maximum value such that the transmission rate is maximized.

10. The method of claim 9, wherein the network identifier is generated using a MAC address of the host server.

11. The method of claim 10, wherein the program code that determines whether the destination of the data is the inside of the host server or the outside of the host server comprises determining whether the type of destination of the data is the inside of the host server or the outside of the host server based on the host ID.

12. The method of claim 11, wherein the program code that determines whether the destination of the data is the inside of the host server or the outside of the host server comprises, when the destination of the data is the inside of the host server, determining a virtual desktop server that will receive the data based on the vendor ID.

13. The method of claim 12, wherein the program code that determines whether the destination of the data is the inside of the host server or the outside of the host server comprises determining a switch port corresponding to a virtual desktop server corresponding to the destination using a forwarding table in which an MAC address corresponding to the destination has been mapped to the switch port.

14. The method of claim 13, wherein the program code that transmits the using memory that is used only for transmission of the data.

15. The method of claim 11, wherein the program code that determines whether the destination of the data is the inside of the host server or the outside of the host server comprises, when a host ID inside the network identifier is not identical to an ID of the host server, determining that the destination of the data is the outside of the host server.

16. The method of claim 15, wherein the program code that transmits the data comprises, when the destination of the data is the outside of the host server, maps a virtual network interface card of the virtual desktop server, which transmits the data, to a virtual network interface card of SR-IOV, and transmitting the data using the SR-IOV.

* * * * *